(No Model.)  2 Sheets—Sheet 1.
S. M. NEELY.
BALING PRESS.
No. 536,093. Patented Mar. 19, 1895.
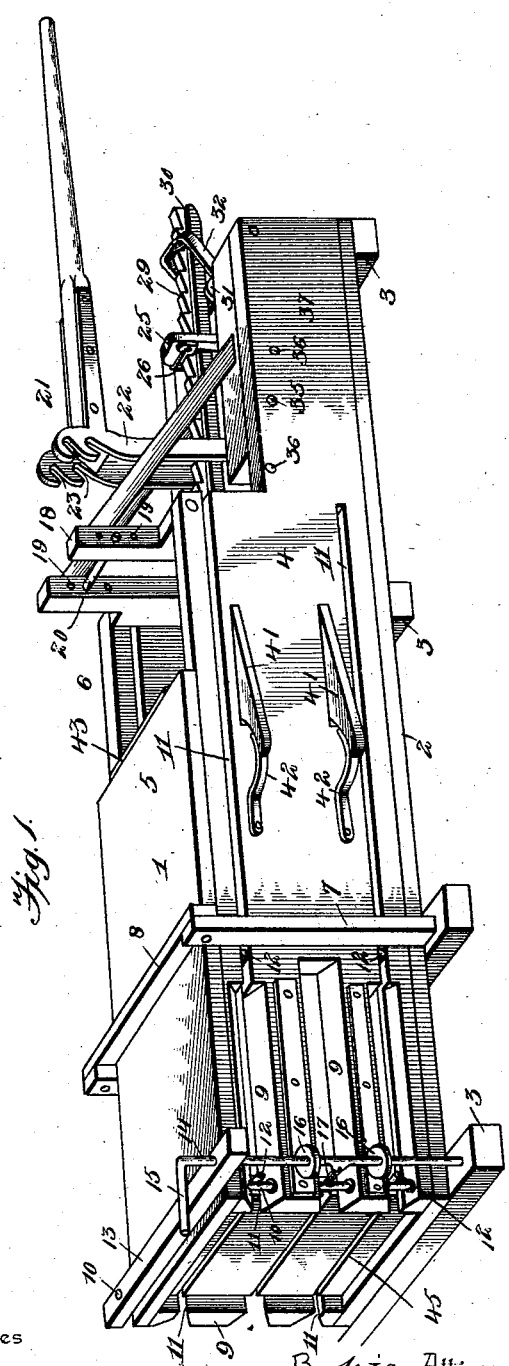
Witnesses
Inventor
Samuel M. Neely,
By his Attorneys.
THE NORRIS PETERS CO., PHOTO-LITHO., WASHINGTON, D. C.

(No Model.) 2 Sheets—Sheet 2.
S. M. NEELY.
BALING PRESS.
No. 536,093. Patented Mar. 19, 1895.
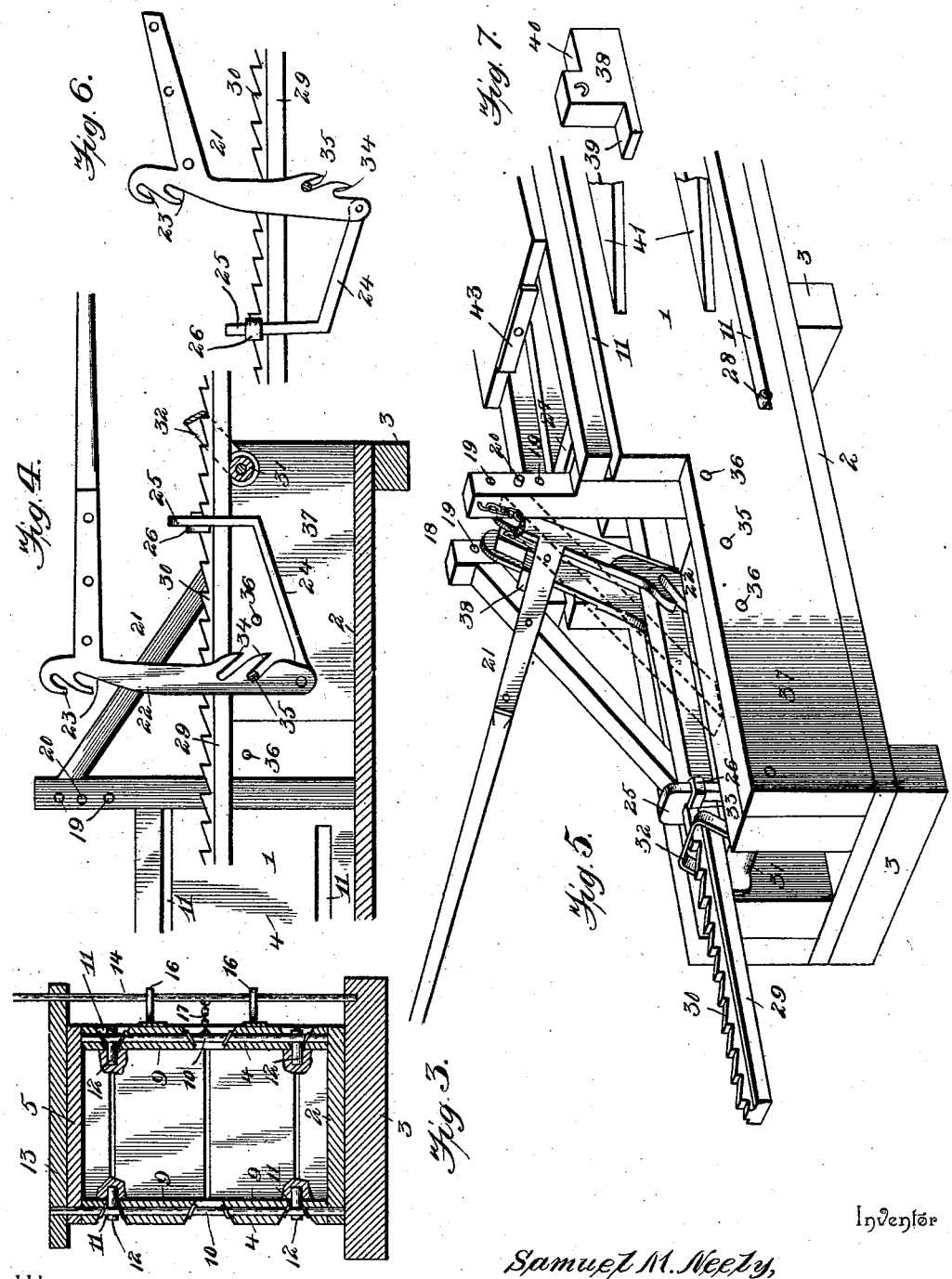
Witnesses
Inventor
Samuel M. Neely,
By his Attorneys.

UNITED STATES PATENT OFFICE.

SAMUEL M. NEELY, OF SMITH'S TURN-OUT, SOUTH CAROLINA.

BALING-PRESS.

SPECIFICATION forming part of Letters Patent No. 536,093, dated March 19, 1895.

Application filed March 23, 1894. Serial No. 504,843. (No model.)

*To all whom it may concern:*

Be it known that I, SAMUEL M. NEELY, a citizen of the United States, residing at Smith's Turn-Out, in the county of York and State of South Carolina, have invented a new and useful Baling-Press, of which the following is a specification.

My invention relates to improvements in baling-presses, particularly adapted for baling hay, fodder, cotton, &c., and it has for its objects to provide simple, direct, and powerful mechanism for operating the plunger; to provide means whereby the operating mechanism may be adjusted to vary the leverage and hence the power applied to the plunger; to provide simple and readily operated construction for facilitating the packing of the material preparatory to the formation of the bale; and to provide apparatus whereby the follower-block may be removed to release the bale after completion without removing any part of the baling-chamber and without necessitating the provision of doors.

Further objects and advantages of the invention will appear in the following description, and the novel features thereof will be particularly pointed out in the appended claims.

In the drawings: Figure 1 is a perspective view of a baling-press embodying my invention. Fig. 2 is a longitudinal section of the same. Fig. 3 is a transverse section on the line 3—3 of Fig. 2. Fig. 4 is a partial longitudinal section, showing the operating lever fulcrumed upon the lower pivot-pin, as when the maximum power is required in baling. Fig. 5 is a detail view of the operating mechanism, showing the parts adjusted for packing the material prior to baling. Fig. 6 is a view of a modified arrangement of the same. Fig. 7 is a detail view in perspective of the securing-block or pin for holding the shoe in engagement with the pivot-pin.

Similar numerals of reference indicate corresponding parts in all the figures of the drawings.

1 designates the baling-chamber which is supported upon the base 2 mounted upon transverse sills 3, and it comprises the sides 4, which preferably converge slightly toward the front end of the press in order to concentrate the hay or other material and assist in he compressing operation, and the top 5 which terminates short of the rear end of the chamber to provide a feed-opening 6 through which the material to be baled is introduced. The sides are held from spreading or bulging by the uprights 7 secured at their lower ends to the projecting ends of the sills and connected, across the top by the tie-bars 8, and the sides may be either solid, as shown, or slatted, as may be preferred. At the front end of the baling-chamber the sides are composed of spaced and preferably reduced slats or arms 9, which may, as shown in the drawings, be formed as extensions of the timbers forming the sides of the main-body of the chamber, and these arms are connected for mutual support and for another purpose hereinafter mentioned by means of the vertical rods 10 which pass through registering perforations therein. The spaces or slots 11 thus formed between the adjacent edges of the arms 9 serve as guide-ways for the lateral studs 12 carried by the follower-blocks, and the vertical rods 10 act as stops to engage these lateral studs and prevent the premature displacement or removal of the follower-blocks from the chamber. Mounted in registering bearings in the extended end of the sill located at the front end of the baling-chamber and in a cross-bar 13 arranged upon the top of the chamber, in proximity to and parallel with one side of the same, is a shaft 14, provided at its upper end with a handle or crank 15 and provided at intermediate points with cams 16 which are adapted, when the shaft is turned, to bear against and press the sides of the baling-chamber inward, and connected to said shaft and a horizontally opposite part of the adjacent vertical rod 10 is a chain 17, whereby when the shaft is turned to swing the cam from the chamber the arms 9 are sprung or flexed outward at their free ends sufficiently to disengage the rods 10 from the lateral studs on the follower and release the latter and hence the bale.

The slots 11 near the top and bottom of the baling-chamber extend the entire length thereof, to permit of the insertion of the follower which is to be forced forward by the plunger to be inserted through the feed-opening after the preparatory packing or tucking of the material has been accomplished.

18 represents standards arranged at the rear end of the baling-chamber and provided with a series of transversely aligned perforations 19 for the reception of the transverse pivot-rod 20, and 21 represents the operating-lever provided with the angularly disposed shoe 22 having spaced notches 23 near its upper end to engage said pivot-rod. By the adjustment of the pivot-rod in different perforations in the standards, and the engagement of different notches of the shoe with said rod, the power of the lever may be altered. This shoe comprises twin parallel plates, which are spaced apart at their upper ends by the end of the lever which is secured therebetween, and at their lower ends by the link-bar 24 which is pivoted therebetween and terminates at its free end in a guide or keeper 25 carrying the pawl 26.

The plunger 27, which is fitted in the baling-chamber and is provided with the lateral guiding studs 28 having antifriction rolls which operate in the horizontal slot near the lower edges of the sides of said chamber, is attached to the front end of the plunger stem 29, provided upon its upper side with a rack 30. This stem passes rearward between the parallel plates or sides of the shoe on the end of the operating-lever, and through the guide or keeper at the terminal of the link-bar in position to be engaged by the pawl 26. The stem is supported at its rear end by the bearing roll 31 over which is arranged a looped locking-pawl 32, to engage the rack and hold the plunger from backward movement during operation, and while the operating-lever is being elevated preparatory to applying power to the plunger stem to force it forward. When it is desired to move the plunger backward the locking pawl may be disengaged from the rack by swinging it forward to the position shown in Fig. 5. The stem is provided at a point adjacent to the plunger with a square notch 33 for the engagement of the operating pawl 26 when the parts are arranged for packing or tucking, as shown in Fig. 5.

The shoe 22 is provided near its lower end with notches as shown at 34 to engage a pivot-rod 35 which is arranged in one of a series of aligned perforations 36 in the head-block 37 below the plane of the plunger-stem, when the maximum power of the press is required as toward the completion of a baling operation. A securing block or pin 38 is provided for insertion between the upper side of the operating-lever and the under side of the pivot-rod 20 to prevent the disengagement of the notches in the shoe from said rod. This block or pin is provided with projections 39 and 40 to suit the interval between the lever and the pivot-rod in different adjustments of the former.

In Fig. 6 I have shown a slightly modified arrangement of the link-bar and operating pawl, in which they are placed in front of the shoe of the operating-lever.

The detents 41, of any desired number, are arranged at the opposite sides of the baling-chamber, and are provided with actuating springs 42; and a holder 43, for a purpose analogous to the detents, namely, to hold the hay in the rear end of the baling chamber during the preparatory packing operation, is pivoted to the rear end of the top of the chamber, at the front end of the feed-opening.

Pivotal ratchet holding devices or pawls 44 are arranged in suitable cavities in the sides of the baling-chamber contiguous to the slots 11, to engage the lateral studs carried by the follower-block which is arranged between the plunger and material which is being baled, and when said studs are engaged by these holding devices the follower-block is securely locked in place, and the plunger may be withdrawn leaving the hay or other material in its compressed state. The follower-blocks are provided upon both sides with grooves 45 through which the tie-wires may be passed.

From the above description it will be understood that the operation of the apparatus is as follows: After adjusting a follower-block in the front end of the chamber, the notches near the upper end of the shoe are engaged with the pivot-rod which is arranged above the plane of the plunger-stem, and the plunger is drawn back until the operating pawl 26 engages in the square notch 33, the locking pawl being thrown out of engagement with the teeth of the stem, all as shown in Fig. 5. The hay or other material to be baled is now introduced through the feed-opening in advance of the plunger, while the free terminal of the operating-lever is elevated to bring the plunger close to the front end of said feed-opening, and then the lever is lowered to push the hay forward in position to be engaged by the detents. This operation is repeated as often as necessary to introduce the desired quantity of material to form the bale. When the plunger is drawn back, a follower-block is placed in advance thereof, the operating-pawl is disengaged from the square notch in the stem, and the locking pawl is thrown down into engagement with the teeth, after which the lever is operated to gradually force the plunger forward and compress the contents of the chamber to the desired bulk. It is preferable under certain circumstances to fulcrum the operating-lever upon the pivot-rod which is below the plane of the plunger-stem when the actual operation of baling is commenced, for the reason that greater leverage is secured and the material can be compressed more tightly. When the bale is compressed to the proper size the lateral studs upon the follower arranged in front of the plunger and advanced by the latter are engaged by the holding devices or pawls 44 provided for that purpose, after which the plunger may be withdrawn and readjusted, as above described, to introduce material for a second bale, while an attendant applies the tie-wires by means of the grooves in the surfaces of the followers. When the bale is tied it is released by straining the draw-chain 17 by means of the cam-shaft and flexing the side of the chamber sufficiently to release the studs of the front follower from the vertical rods 10. The spring of the bale will throw said front follower beyond the rods 10 after which the side of the chamber is allowed to resume its normal position and is assisted, if necessary, by turning the shaft sufficiently to cause the cam to bear thereagainst. The pressure of the plunger in packing the succeeding bale will force the completed bale from the chamber, and the rear follower, when it reaches the stop-rods 10 will be held to assist in the compression of the succeeding bale.

It will be understood that various changes in the form, proportion, and minor details of construction may be resorted to without departing from the spirit or sacrificing any of the advantages of the invention.

Having thus described my invention, I claim—

1. In a baling-press, the combination with a baling-chamber, a plunger, and operating mechanism therefor, of follower-blocks provided with lateral studs, vertical stop-rods arranged at the front end of the chamber in the paths of and adapted to engage said studs, and means for moving a stop-rod laterally to disengage the follower-blocks, substantially as specified.

2. In a baling-press, the combination with a chamber, a plunger, and means for operating the same, of follower-blocks provided with lateral studs, vertical stop-rods arranged at the front end of the chamber in the paths of and adapted to engage said studs one of the stop-rods being laterally movable, and a revoluble shaft flexibly connected to the movable stop-rod whereby the latter may be moved laterally to disengage the studs and release the followers, substantially as specified.

3. In a baling-press, the combination with a chamber, a plunger, and means for operating the same, of follower-blocks provided with lateral studs, stops carried by the sides of the chamber at its front end to engage said studs, and means for deflecting one side of the chamber adjacent to the stops carried thereby, to disengage the studs and release the follower-blocks, substantially as specified.

4. In a baling-press, the combination with a chamber, a plunger, and means for operating the same, of follower-blocks provided with lateral studs, operating in horizontal slots in the sides of the chamber, stop-rods intersecting the slots in the sides of the chamber and adapted to engage the studs on the follower-blocks, a shaft arranged parallel with one side of the chamber adjacent to the stop-rod carried thereby and flexibly connected to said rod, and a cam carried by the shaft to engage and press the side of the chamber inward, substantially as specified.

5. In a baling-press, the combination with a chamber having slotted walls, a plunger operating in the chamber, and means for operating the same, of stops arranged adjacent to the outlet end of the chamber, means for communicating lateral movement to the stops at one side of the chamber, detents arranged adjacent to the feed-opening of the chamber and adapted to hold the material to be baled in place during the feeding operation, pawls arranged adjacent to the slots in the walls of the chamber and between said terminal stops and the detents, at a predetermined distance from the former, to regulate the size of the bales, and follower-blocks provided with studs fitting slidably in the slots in the walls of the chamber, the studs on the follower-block in advance of a bale being adapted to engage the terminal stops at the outlet end of the chamber, and the studs on the follower-block in rear of a bale being adapted to engage and be held from backward movement by said pawls, substantially as specified.

6. In a baling-press, the combination with a frame, a baling-chamber, and a plunger operating in the chamber and having a stem, of an operating lever, an operating pawl connected to and actuated by said lever and adapted to engage said plunger-stem, means for preventing retrograde movement of the plunger, and means for mounting the operating lever adjacent to or remote from the plane of the plunger-stem to vary the throw of the operating-pawl, substantially as specified.

7. In a baling-press, the combination with a frame-work, a baling-chamber, a plunger having a toothed stem, and an operating-lever, of an operating-pawl adapted to engage said toothed stem, connections between the operating-pawl and the said lever, a locking pawl adapted to be temporarily disengaged from the teeth of the stem, and means for locking the operating-pawl to the stem adjacent to the plunger, whereby the latter may be reciprocated to pack or tuck the material in the chamber preparatory to baling, substantially as specified.

8. In a baling-press, the combination with a frame-work, a baling-chamber, and an operating lever, of a plunger having a stem provided with ratchet-teeth, and an auxiliary squared tooth 33, an operating pawl adapted to engage the teeth of said stem, connections between the operating pawl and the operating lever, and a locking pawl adapted to be temporarily disengaged from the teeth of the stem, said operating pawl being adapted to engage the auxiliary squared tooth 33, whereby the plunger may be reciprocated to pack or tuck the material in the chamber preparatory to the baling, substantially as specified.

9. In a baling-press, the combination with a framework a baling-chamber, and a plunger having a stem, of rods arranged in the framework respectively above and below the plane of the plunger-stem, an oscillatory shoe having an attached operating-lever and provided at its upper and lower ends with spaced notches to engage one of the said rods, an operating-pawl connected to said shoe, and a locking-pawl, substantially as specified.

10. In a baling-press, the combination with a chamber, a plunger having a stem, and a locking-pawl to hold the stem from backward movement, of an operating-lever, a shoe provided at its upper end with spaced notches, a pivot-rod engaged by said notches to fulcrum the shoe, a locking-block adapted to be inserted between the inner end of the operating-lever and said pivot-rod to prevent disengagement of the notches of the shoe from said pivot-rod, and an operating-pawl connected with the shoe, substantially as specified.

In testimony that I claim the foregoing as my own I have hereto affixed my signature in the presence of two witnesses.

SAMUEL M. NEELY.

Witnesses:
J. F. RIED,
JNO. A. BLACK.